(12) United States Patent
Subramanian et al.

(10) Patent No.: US 11,509,480 B2
(45) Date of Patent: Nov. 22, 2022

(54) REMOTE ATTESTATION BASED ON RUNTIME CONFIGURATION

(71) Applicant: VMware, Inc., Palo Alto, CA (US)

(72) Inventors: Samyuktha Subramanian, Mountain View, CA (US); Jesse Pool, Ottawa (CA)

(73) Assignee: VMWARE, INC., Palo Alto, CA (US)

( * ) Notice: Subject to any disclaimer, the term of this patent is extended or adjusted under 35 U.S.C. 154(b) by 130 days.

(21) Appl. No.: 16/917,719

(22) Filed: Jun. 30, 2020

(65) Prior Publication Data
US 2021/0409223 A1 Dec. 30, 2021

(51) Int. Cl.
*H04L 29/06* (2006.01)
*H04L 9/32* (2006.01)

(52) U.S. Cl.
CPC .................. *H04L 9/3234* (2013.01)

(58) Field of Classification Search
CPC ................................... H04L 9/3234
USPC ........................................ 713/159
See application file for complete search history.

(56) References Cited

U.S. PATENT DOCUMENTS

| | | | | |
|---|---|---|---|---|
| 10,742,421 | B1* | 8/2020 | Wentz | H04L 9/3278 |
| 2010/0281273 | A1* | 11/2010 | Lee | F04B 33/00 |
| | | | | 713/190 |
| 2019/0028466 | A1* | 1/2019 | Falk | H04L 63/20 |
| 2020/0366754 | A1* | 11/2020 | Wang | H04L 63/0807 |
| 2021/0250176 | A1* | 8/2021 | Wood | G06F 21/44 |

OTHER PUBLICATIONS

Subashini, "A survey on security issues in service delivery models of cloud computing" Jul. 11, 2010, Journal of Network and Computer Applications, pp. 1-11 (Year: 2010).*
Microsoft, "Register computer with Host Guardian Service", Microsoft Docs, https://docs.microsoft.com/en-us/windows-server/security/guarded-fabric-shielded-vm/guarded-fabric-manage-hgs#managing-attestation-policies, 4 pages.
Trusted Computing Group, "TCG Remote Integrity Verification: Network Equipment Remote Attestation System", Version 1.0, Revision 9b, Jun. 15, 2019, 24 pages.
Birkholz, H. et al., "Remote Attestation Procedures Architecture", https://tools.ietf.org/html/draft-ietf-rats-architecture-01, Feb. 4, 2020, 19 pages.

* cited by examiner

*Primary Examiner* — Shawnchoy Rahman
*Assistant Examiner* — Gregory A Lane
(74) *Attorney, Agent, or Firm* — Patterson & Sheridan, LLP

(57) ABSTRACT

A method of attestation of a host machine based on runtime configuration of the host machine is provided. The method receives, at an attestation machine, a request from the host machine for attestation of a software executing on the host machine, the request including at least one security-related configuration of the software at launch time and a corresponding runtime behavior of the software when the security-related configuration changes. The method then generates a claim based on evaluating a value associated with the at least one security-related configuration and the corresponding runtime behavior of the software when the value changes. The method also generates an attestation token after a successful attestation of the software and include in the attestation token the generated claim. The method further transmits the attestation token to the host machine.

20 Claims, 4 Drawing Sheets

REMOTE ATTESTATION BASED ON RUNTIME CONFIGURATION

BACKGROUND

Remote attestation is the ability for a remote entity to make reliable statements about a target entity. In a network, one or more nodes (e.g., computing devices, host machines, virtual computing instances, such as virtual machines and containers, etc.), each referred to as an attestation machine, may be assigned for attestation of other nodes (e.g., attesting to software running on the other nodes) in the network. For example, one or more attestation machines in a datacenter may execute an attestation service for recognizing and validating software (e.g., operation systems)—that were launched on the other nodes of the datacenter. Conventionally, an attestation machine verifies and validates software— that launched on another node based on the data received from the other node at boot-time of the software and has no way of tracking potential changes to the attested state (e.g., caused by a change in software configuration) at a later time (e.g., during the execution of the software). In other words, conventional attestation protocols are not designed to perform runtime tracking of the attested state of a target system.

For example, when a node sends an attestation request (for example: to attest software launched) to an attestation server, the request may include one or more launch time configurations of the software. The attestation machine may evaluate the launch time configurations (e.g., by comparing them to previously trusted configurations) and based on such evaluation may issue an attestation certificate for the requesting node. Some attestation services may issue the certificate by evaluating the bits launched (for the software) without reading (and comparing) the configuration values. However, if, subsequent to the issuance of the attestation certificate, the approved state of the requesting node changes (e.g., one or more of the attested launch time configurations change), the attestation machine may have no way of recognizing the change(s). Subsequent modifications to the attested configuration (e.g., security-related configuration) may cause great security risks to the requesting node, as well the network to which the node is coupled.

DETAILED DESCRIPTION

Figure 1:
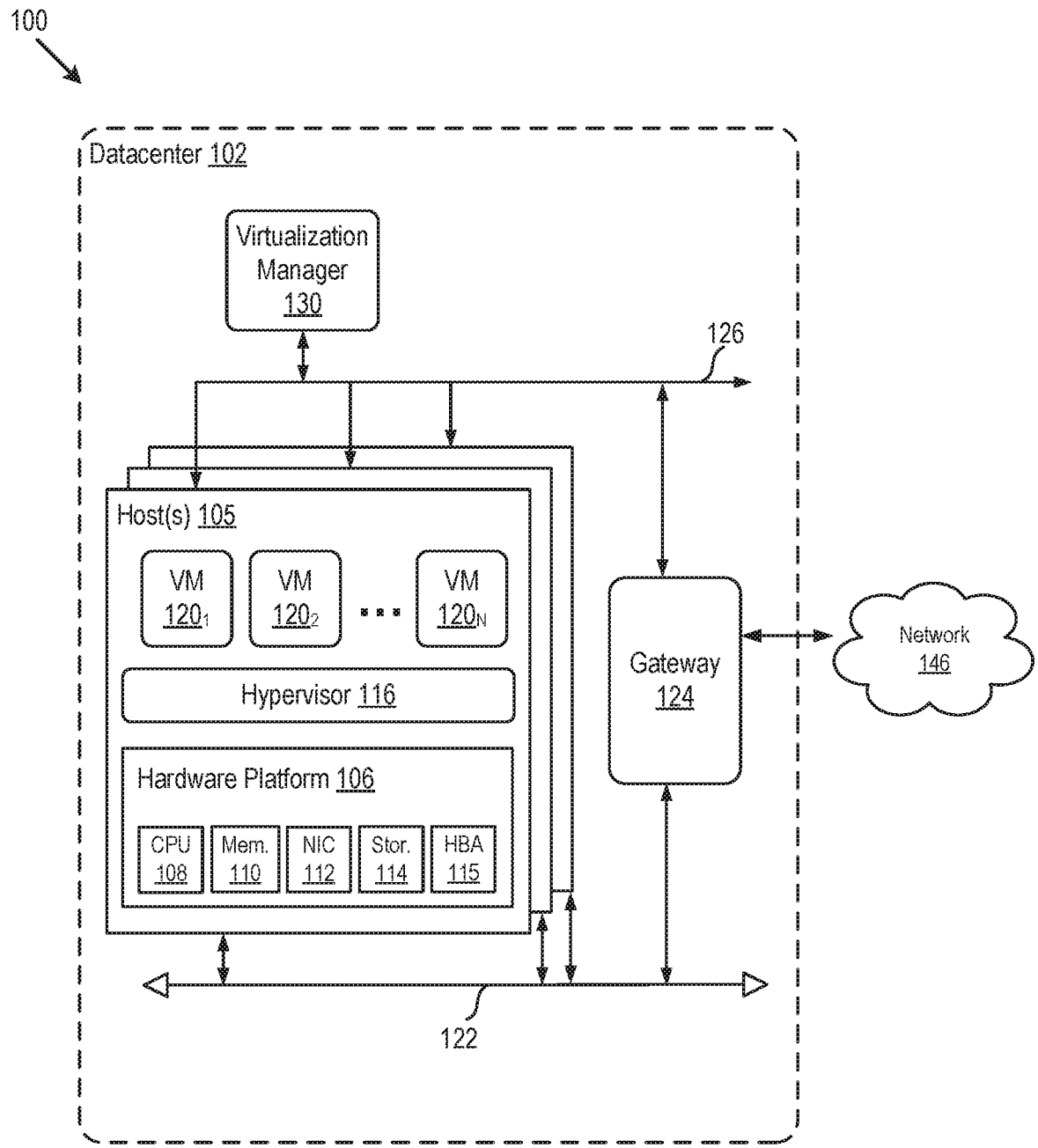
FIG. 1 depicts a block diagram of a computer system in which one or more embodiments of the present disclosure may be utilized.

Conventional attestation service protocols do not perform an exhaustive assessment of the target systems. For example, an attestation machine may attest to the software (e.g., operating system, firmware, etc.) running on a host machine and provide the host machine with a trust certificate. While placing trust (e.g., providing a trust certificate) on a host machine through such a mechanism is necessary, it may not be sufficient. That is, the trust placed by an attestation machine on a state of a host machine at a certain point of time may be broken or jeopardized by the host machine's subsequent change(s) of state. For example, an attestation certificate issued for a launch time state of an operating system running on a host machine may be later (e.g., at runtime of the operating system) invalidated, for example, when the state of the operating system changes.

Accordingly, some embodiments provide an attestation mechanism that can use the state of the software running on a node at one point of time (e.g., at software's launch time) to make attestation claims about the behavior of the software at a subsequent point of time (e.g., at software's runtime). In some embodiments, the attestation machine may receive the software configuration data from a host machine that executes the software. In one embodiment, the software configuration may be part of an attestation request sent by a host machine. For example, the configuration data may be sent in the form of one or more entries of an event log that is generated based on the execution of the software and sent to the attestation machine as part of the attestation request. The attestation machine may then use this configuration data (e.g., associated with the software's execution at certain point of time) to make attestation claim(s) that specify future behavior of the software (e.g., when the configuration data changes).

In some embodiments, after successful attestation of the software, the attestation machine may add the attestation claims to a certificate generated for the node that has made the attestation request. The attestation request, as will be described in more detail below, may include one or more event log entries that declare the action(s) or behavior(s) taken by a requesting node if a particular event occurs. The attestation machine may generate (and store) a corresponding claim for each such entry. The attestation service would have already verified (or attested) the firmware, kernel or operating system, of the requesting node by the stage in the attestation protocol when it parses the event log entries that declare runtime behaviors. Therefore, the attestation service can trust that these actions will be taken in the face of a configuration change (or any event that can potentially lower the trust in the requesting node). In other words, by the time the attestation machine parses these entries in the event log, it knows that the requesting node has launched only trusted binaries which will perform the action (in response to a certain event) it claims it will perform. In some embodiments, an administrator may add to, remove from, or edit the claims that an attestation machine verifies during the course of the attestation protocol. In some embodiments, the configuration data (e.g., the entries in the event log) used for generating the claims by the attestation machine may include configuration data that is associated with the security of the software, the host machine executing the software, and/or the network (e.g., of a datacenter) to which the host machine is connected.

FIG. 1 depicts a block diagram of a computer system 100 in which one or more embodiments of the present disclosure may be utilized. Computer system 100 may include a datacenter 102 connected to a network 146. Network 146 may be, for example, a direct link, a local area network (LAN), a wide area network (WAN), such as the Internet, another type of network, or a combination of these networks.

Datacenter 102 may include host(s) 105, a virtualization manager 130, a gateway 124, a management network 126, and a data network 122. Datacenter 102 may include additional components (e.g., a disturbed data storage, etc.) that are not shown in the figure. Networks 122, 126, in one embodiment, may each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network (e.g., by using different VLAN identifiers).

Each of hosts (or host machines) 105 may be constructed on a server grade hardware platform 106, such as an x86 architecture platform. For example, hosts 105 may be geographically co-located servers on the same rack.

Hardware platform 106 of each host 105 may include components of a computing device, such as one or more central processing units (CPUs) 108, system memory 110, a network interface 112, storage system 114, a host bus adapter (HBA) 115, and other I/O devices, such as, for example, USB interfaces (not shown). Network interface 112 may enable host 105 to communicate with other devices via a communication medium, such as data network 122 or management network 126. Network interface 112 may include one or more network adapters, which may also be referred to as network interface cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Host 105 may be configured to provide a virtualization layer, also referred to as a hypervisor 116, that abstracts processor, memory, storage, and networking resources of hardware platform 106 into multiple virtual machines 1201 to 120N (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines.

In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 may communicate with hosts 105 via a network, shown as a management network 126, and carries out administrative tasks for datacenter 102, such as managing hosts 105, managing VMs 120 running within each host 105, provisioning VMs, migrating VMs from one host to another host, and load balancing between hosts 105. Virtualization manager 130 may be a computer program that resides and executes in a central server in datacenter 102 or, alternatively, virtualization manager 130 may run as a virtual computing instance (e.g., a VM) in one of the hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as including a hypervisor 116 and virtual machines 120, in an embodiment, hosts 105 may include a standard operating system instead of a hypervisor 116, and hosts 105 may not include VMs 120. In such an embodiment, datacenter 102 may not include virtualization manager 130.

Gateway 124 may provide hosts (or host machines) 105, VMs 120, and other components in datacenter 102 with connectivity to one or more networks used to communicate with one or more remote datacenters or other entities, such as one or more software repository servers (e.g., for installing new software and/or upgrading the already installed software on hosts 105), one or more key management servers (e.g., for receiving encryption keys by hosts 105), etc. Gateway 124 may manage external public Internet Protocol (IP) addresses for VMs 120 and route traffic incoming to and outgoing from datacenter 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

In some embodiments, one or more of host machines 105 may form an attestation cluster that is responsible for attestation of software (e.g., an operating system, such as ESXi™ provided by VMware®) running on the other host machines of datacenter 102. For example, as will be described in more detail below, one of the host machines 105 (e.g., an attestation machine in the attestation cluster) may include an attestation service (or module) that may receive attestation requests from the other host machines 105 for different software running on the host machines, and may provide the requesting host machines with attestation certificates after successfully verifying the different software running on the requesting host machines. After receiving the attestation request for the software, the attestation machine may compare metadata associated with the software (and included in the attestation request) with trusted metadata stored at the attestation machine (or another trusted server) to attest to the software (e.g., to authenticate and validate the software).

After the software is successfully authenticated, the attestation machine may generate a certificate to send to the requesting host machine 105. The attestation machine may also generate one or more attestation claims based on the configuration data received in the attestation request (e.g., as part of the metadata associated with the software, or separate from the metadata) in some embodiments. Examples of these attestation claims are discussed in more detail below, with reference to FIG. 4. The attestation machine may include one or more attestation claims in the attestation certificate before sending the certificate to the requesting host machine 105. In some embodiments, as will be described in more detail below, the generated claim(s) may determine a runtime behavior of the host machine that receives the attestation certificate.

Figure 2:
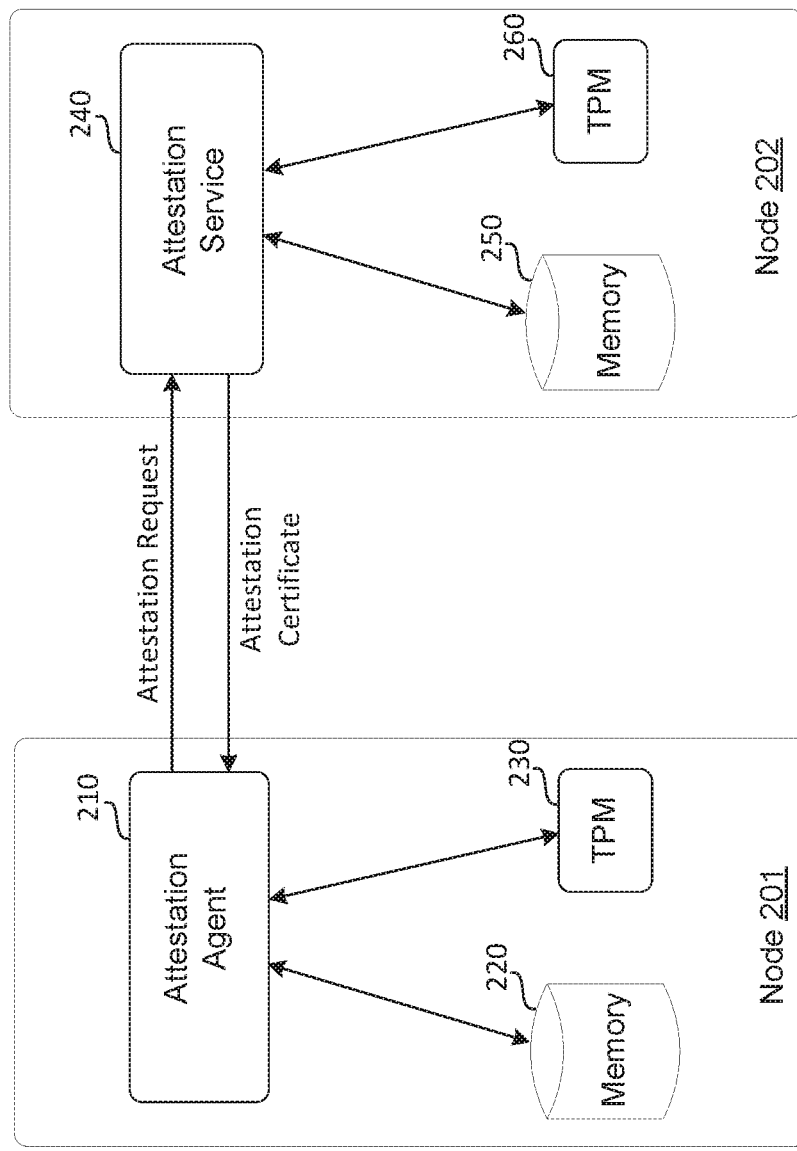
FIG. 2 is a diagram illustrating an attestation process performed between two nodes of a datacenter, according to an example embodiment of the present application.

FIG. 2 is a diagram illustrating an attestation process performed between two nodes of a datacenter, according to an example embodiment of the present application. FIG. 2 includes a first node 201 and a second node 202. Nodes 201 and 202 may be two of the host machines 105 described above, with reference to FIG. 1. Each of nodes 201 and 202 may include, among other components, as described in FIG. 1, a memory, such as memories 220 and 250 (e.g., a non-volatile storage 114, with reference to FIG. 1) and a Trusted Platform Module (TPM), such as TPMs 230 and 260. Additionally, the first node 201 may include an attestation agent (or module) 210 for managing attestation procedures. The second node 202 may also include an attestation service (or module) 240 for attesting different software installed on other nodes, such as node 201. Each of these modules may reside in hypervisor 116 or may be independent of hypervisor 116. Each of TPMs 230 and 260 may be a tamper resistant piece of cryptographic hardware or processor (e.g., in hardware platform 106) in nodes 201 and 202, which may implement cryptographic functions (e.g., computing hash functions, key management and generation, random number generation, integrity measurements, etc.) for software attestation.

In order for node (or attestation machine) 202 to be able to validate software (e.g., firmware, operating system, etc.) installed on node 201, node 202 may compare metadata of the software, or an image of the software, as received from node 201, to metadata or images of previously approved or validated software. For example, in order to recognize and validate an operating system software (e.g., ESXi™ provided by VMware®) running on node 201, the attestation machine 202 may need to be configured with information, such as metadata or an image, that uniquely identifies the operating system software (e.g., type, version, etc.) that is expected to run in the datacenter.

For example, during an attestation process of the software on node 201 (e.g., when the software is executed for the first time on node 201), attestation agent 210 may send an attestation request to attestation service 240 of attestation machine 202. The attestation request may include metadata generated from the execution of the software and measured by TPM 230 to node 202. After attestation service 240 receives the request, the attestation service 240 may compare the metadata included in the request with trusted metadata configured to node 202 (e.g., stored at memory 250). The trusted metadata may have been configured to node 202 manually (e.g., through API calls executed by an administrator) or automatically (e.g., from a trusted software repository, such as a vSphere® installation bundle (VIB) depot provided by VMware®). After comparing the received metadata with the configured metadata, attestation service 240 may be able to attest to the software (e.g., when the two metadata match) or deny verification of the software (e.g., when node 202 is not configured with the matching metadata).

In some embodiments, the attestation request sent by attestation agent 210 may include an event log of the software executed on node 201 to the attestation service 240 of node 202. Attestation service 240 may use the received event log to attest to the software running on node 201. The event log, in some embodiments, may include one or more entries that each may contain a hash of a component of the software generated (e.g., and measured into TPM 230) during the execution of the software. In some embodiments, attestation service 240 may replay the events of the event log in the same order on attestation machine 202 to recreate the hashes (e.g., using TPM 260) and to determine the authenticity of the software. In some embodiments, one or more hashes in the event log may be compared (e.g., by attestation service 240) to signed hashes in metadata stored at memory 250 to attest to the software. After a successful authentication of the software, attestation service 240 may generate an attestation certificate (or token), for example, using TPM 260 of the attestation machine, and send the attestation certificate to attestation agent 210 of node 201. In some embodiments, the attestation certificate may include a JavaScript Object Notation (JSON) web token (JWT). In some cases, node 201 may use the attestation certificate to receive encryption keys from, for example, one or more key management servers (KMSs), such as to be used for further communication with other services running on the same, or another, network.

As described above, in some embodiments, the attestation token may include one or more claims made by attestation service 240 that determine runtime behavior of the attested software. In some such embodiments, these claims may be made by evaluating one or more entries of the attestation request (e.g., of the event log) that include data associated with the runtime configuration (e.g., security-related configuration) of the software. That is, the attestation machine may generate claims using one or more entries included in the event log of the requesting node. To evaluate the configuration data included in the attestation request, attestation service 240 may leverage data configured to node 202 (e.g., stored at memory 250). This 'claim data' is used by the attestation service to determine what claims it should verify during remote attestation. For example, attestation service 240 may validate the launch-time value of a runtime configuration data in the attestation request with the configured claim data to determine whether a claim can be made for the runtime configuration data. In some embodiments, these claim data may be configurable to node 202 dynamically (e.g., the claim data may be added to, deleted from, or edited in storage 250, for example, by an administrator of the datacenter).

Figure 3:
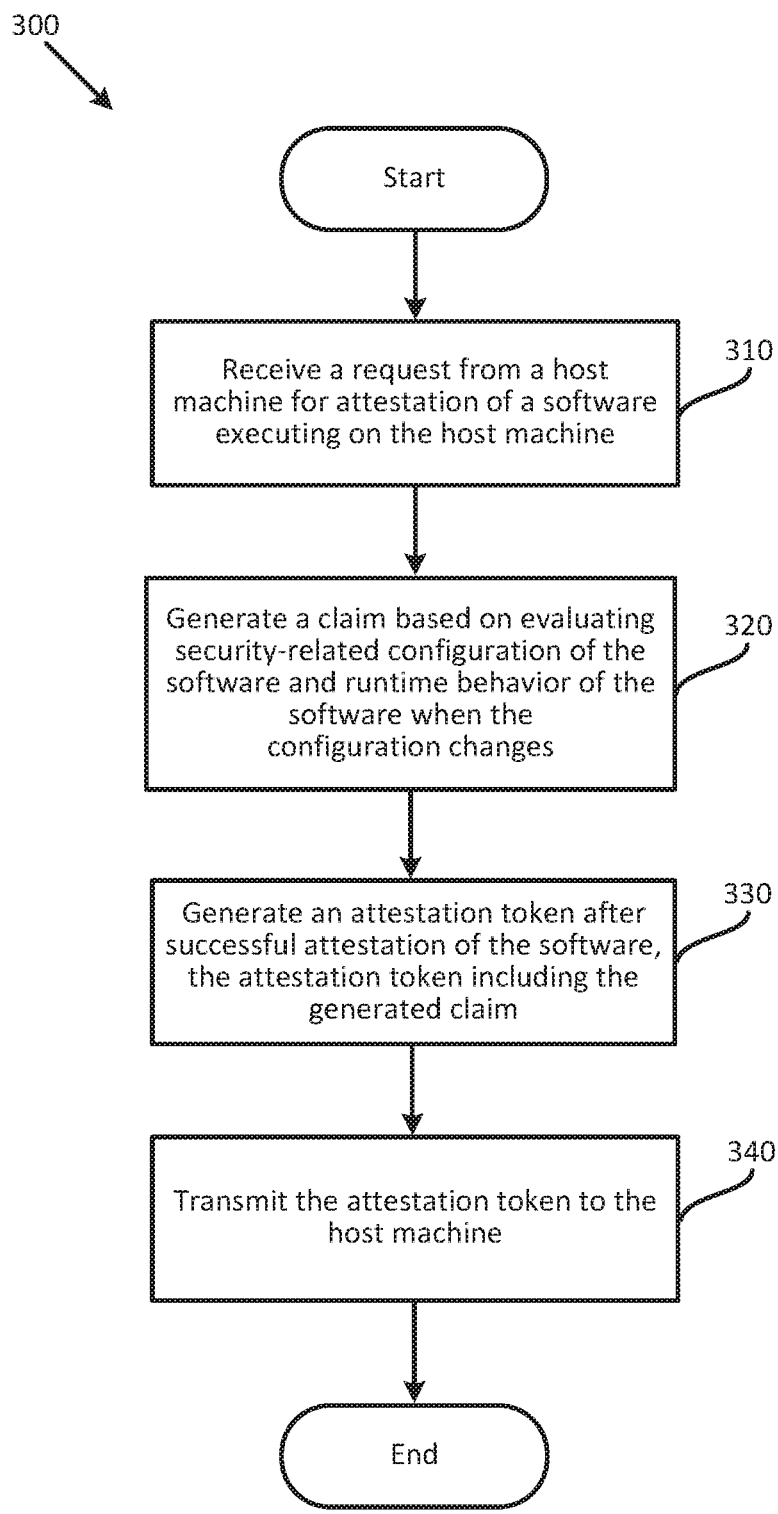
FIG. 3 is a flowchart illustrating an example process/method for attesting software running on a node using runtime configuration of the node, according to an example embodiment of the present application.

FIG. 3 is a flowchart illustrating an example process/method 300 for attesting software running on a node using runtime configuration of the node, according to an example embodiment of the present application. Process 300 may be performed, for example, by an attestation service/module (e.g., such attestation service 240, with reference to FIG. 2) executing on an attestation machine in some embodiments. Process 300 may begin, at 310, by receiving, at the attestation machine, a request from a host machine for attestation of a software executing on the host machine. As described above, the request may include an event log associated with the software (e.g., generated after the launch time of the software) sent by an attestation agent (e.g., such as attestation agent 210, as shown in FIG. 2) of the host machine that runs the software.

The request may include, among other data (e.g., software identification (ID), event type, hashes of different executed components of the software, etc.), one or more entries corresponding to one or more security-related configurations of the software at a certain point of time (e.g., at launch time) and a corresponding runtime behavior of the software when the security-related configuration changes (e.g., at a later time). In some embodiments, each security-related configuration may correspond to one entry in the request. For example, one entry of the request may include data that indicates whether the local console access (or local command execution) is enabled at launch time of the software (e.g., launch time of ESXi™). The request may also include another entry, data of which may indicate what the software would do if the local console access configuration changes during the runtime of the software.

In some embodiments, when the local console access is enabled, a user (e.g., an administrator) may be able to modify critical (e.g., security-related) configurations of the software that may affect the security of the host machine running the software. For example, when the local console access is enabled, the user may be able to change the host machine's memory configuration, processor(s) configuration, or even shut down/restart the host machine. As such, it may be imperative for the overall security of the system that no user (including a potential attacker) should have access to the host machine via the local console. As a result, the attestation machine may issue an attestation token only when a first entry of the event log indicates that the local console access is currently disabled and a second (corresponding) entry of the event log indicates that if the local console access is (later) enabled, the host machine will discard the attestation token it has received from the attestation machine and, for example, may send another request for a new attestation token or restart.

It should be notated that, although the security-related configuration and the runtime behavior of the software are described as being two separate entries of the request, in some embodiments, one entry in the request may include data that is indicative of both values. Additionally, in some embodiments, there may be more than two entries in the request associated with a security-related configuration and the runtime behavior of the software in the event the configuration changes. For example, a first entry in the request may indicate that a remote access console is disabled, a second entry in the request may indicate that the host machine will discard the attestation token if the remote access console is enabled, and a third entry in the request may indicate that the host machine will further discard all the encryption keys it has received based on discarding the attestation token.

Returning to FIG. 3, at 320, process 300 may generate a claim based on evaluating a value associated with the security-related configuration and the corresponding runtime behavior of the software when the value changes. An attestation claim, in some embodiments, may include an assertion of the (security-related) configuration that the attestation machine has found to be true. For example, in the above-described example, the attestation machine may generate a claim after determining that both local console access is currently disabled, and also, the host machine would discard the attestation token if the local console access is later enabled.

After the attestation machine (i) approves the value associated with the security-related configuration and (ii) determines that the host machine will perform a certain action if the approved value later changes, the attestation machine may generate, at 330, an attestation token that includes the generated claim. In some embodiments, the attestation machine may include the claim in the token after a successful attestation of the software (e.g., after the metadata in the event log matches the metadata configured to the host machine, as described above). That is, the attestation machine may add the claim(s) to an attestation token after the authenticity of the software is determined to be verifiable (e.g., the claims may be added at the later stages of the verification of the event log). This is important because only after it is determined that the software is trustable, the attestation machine may ascertain the behavior indicated in the request will in fact be the runtime behavior of the software if the corresponding configuration changes.

It should be noted that, in some embodiments, additional conditions may be needed to be satisfied before generating an attestation token. For example, in one embodiment, the attestation machine may generate the attestation token only when the configuration of the requesting host machine indicates that the unified extensible firmware interface (UEFI) secure boot is enabled. The UEFI may provide a software interface between an operating system and platform firmware of the requesting host machine.

In some embodiments, the attestation token may include a JSON web token (JWT). In some such embodiments, the generated claim may be added to the payload of the JWT before sending the JWT to the requesting host machine. After generating the attestation token and adding the generated claim to the attestation token, process 300 may transmit, at 340, the generated attestation token to the host machine. The process may then end.

Figure 4:
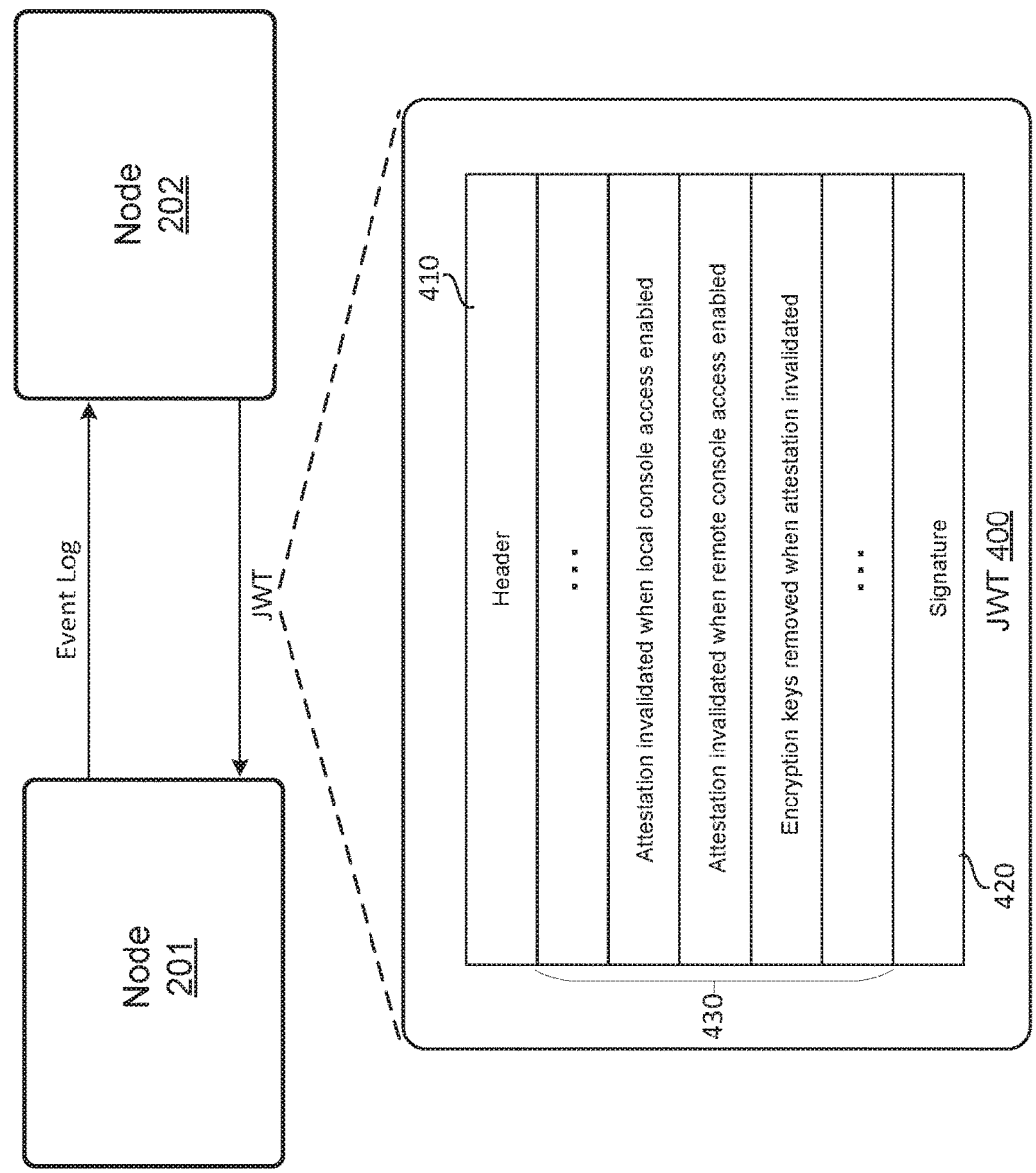
FIG. 4 is a diagram illustrating an example attestation token that includes one or more attestation claims, according to an example embodiment of the present application.

FIG. 4 is a diagram illustrating an example attestation token that includes one or more attestation claims, according to an example embodiment of the present application. As illustrated, FIG. 4 includes a first node 201 and a second node 202. The first and second nodes 201 and 202 may be the same nodes discussed above, with reference to FIG. 2. For example, node 201 may be a host machine that needs an attestation certificate for a software running on host machine 210, while node 202 may be an attestation machine that provides such a certificate.

As shown in the figure, node 201 may send an attestation request that includes an event log associated with the software to node 202. The attestation request may include one or more security-related configurations and their corresponding runtime behaviors, as different entries of the event log. After verifying and validating the received event log, node 202 may send an attestation token to node 201. The attestation token, which may be a JWT, may include one or more attestation claims created based on evaluating the security-related configurations of the event log. JWT 400, as illustrated in FIG. 4, may include a header 410, a signature 420, and a payload 430. Each one of the components of JWT 400 may include data that is hashed using a particular hash function.

Header 410 may identify which algorithm has been used to generate signature 420. Signature 420 may use public and/or private keys to encrypt the data. The signature may be calculated by encoding header 410 and payload 430 using a particular encoding (e.g., hash) algorithm and concatenating the header and payload together with a period separator. The generated string may then run through a cryptographic algorithm which is specified by header 410. Payload 430 may include a number of claims including the attestation claims generated for the runtime configuration of the attested software. Three example claims are shown as part of the payload 430.

The first claim indicates that the attestation may be invalidated if the local console access is enabled. That is, after the attestation, if, at any point of time, the local console access of the attested host machine is enabled, the host machine should discard this attestation token and seek another attestation token. In some embodiments, the attestation machine may refuse any subsequent attestation request made by the host machine until and unless the host machine reboots. This is because, if at any point of time, the host machine has enabled the local console access, such a runtime change may have exposed the host machine to a security attack which may have resulted in a security breach. As such, the host machine may be forced to reboot in order to receive another attestation token.

In some other embodiments, an exposed host machine may not require a reboot for receiving another attestation token. In some such embodiments, after receiving the second attestation token request, the attestation machine may inspect the event log associated with the second request to determine whether a new change that requires the host machine to reboot has occurred or not. For example, the attestation machine may examine the entries of the event log to determine whether subsequent to enabling the local console access any new software is installed on the host machine or not. If there is no new software installation, the host machine may issue a second attestation certificate for the host machine (e.g., after all the other attestation criteria are satisfied).

The other example attestation claims, as shown in FIG. 4, are invalidating the attestation token when the remote console access is enabled, and also removing the encryption keys associated with an attestation token when the attestation token is invalidated. For example, a security-related configuration in an entry of the event log may indicate that currently (e.g., at launch time) the remote console access is disabled. A corresponding entry in the event log may include a runtime behavior configuration that indicates, if the remote console access is enabled (e.g., later at runtime), the host machine would discard this attestation token.

A second corresponding entry of the event log may also indicate that, if this attestation token in discarded (or invalidated), discard (or remove) all the encryption keys that are related to this attestation token. As a result, the attestation machine has generated a claim that requires discarding the attestation token when the remote access key is enabled and removing the associated encryption keys when the attestation token is discarded. Ordinarily, an attestation service would have to poll the requesting nodes (or employ some other out-of-band mechanism) to track its trust after attestation is complete—but in this case, the attestation machine can perform runtime tracking of the attested state of a target system after only a single occurrence of the attestation protocol.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing.

Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method of attestation of a host machine based on runtime configuration of the host machine, comprising:
receiving, at an attestation machine, a request from the host machine for attestation of a software executing on the host machine, the request comprising a value associated with a security-related configuration of the software at launch time and a corresponding runtime behavior of the software when the value associated with the security-related configuration changes;
generating a claim based on evaluating the value associated with the security-related configuration and the corresponding runtime behavior of the software when the value associated with the security-related configuration changes;
generating an attestation token after a successful attestation of the software, the attestation token including the generated claim; and
transmitting the attestation token to the host machine.

2. The method of claim 1, wherein the request from the host machine comprises an event log associated with an execution of the software at the launch time, the event log comprising a plurality of entries at least one of which is associated with the security-related configuration and the corresponding runtime behavior of the software.

3. The method of claim 2, wherein the event log further comprises metadata associated with the software, the metadata comprising a plurality of hashes associated with a plurality of components of the software executed at the launch time, wherein the successful attestation of the software comprises a successful matching of at least one of the plurality of hashes against a corresponding hash stored at the attestation machine.

4. The method of claim 1, wherein the security-related configuration comprises remote or local console access configuration of the host machine, and the corresponding runtime behavior of the software when the value associated with the security-related configuration changes comprises discarding the attestation token.

5. The method of claim 4, wherein generating the claim comprises generating the claim when evaluating the value associated with the security-related configuration at the launch time indicates that the local or remote console access is disabled.

6. The method of claim 5, wherein if, at runtime, the local or remote console access is enabled, the host machine discards the attestation token.

7. The method of claim 1, wherein the security-related configuration comprises an attestation status configuration of the software, and the corresponding runtime behavior of the software when the value associated with the security-related configuration changes comprises removing one or more encryption keys the host machine received based on the attestation token.

8. The method of claim 1, wherein the attestation token comprises a JSON web token (JWT) and the generated claim is part of a payload of the JWT.

9. A non-transitory computer readable medium comprising instructions that, when executed by one or more processors of a computing system, cause the computing system to perform a method of attestation of a host machine based on runtime configuration of the host machine, the method comprising:
receiving, at an attestation machine, a request from the host machine for attestation of a software executing on the host machine, the request comprising a value associated with a security-related configuration of the software at launch time and a corresponding runtime behavior of the software when the value associated with the security-related configuration changes;
generating a claim based on evaluating the value associated with the security-related configuration and the corresponding runtime behavior of the software when the value associated with the security-related configuration changes;
generating an attestation token after a successful attestation of the software, the attestation token including the generated claim; and
transmitting the attestation token to the host machine.

10. The non-transitory computer readable medium of claim 9, wherein the request from the host machine comprises an event log associated with an execution of the software at the launch time, the event log comprising a plurality of entries at least one of which is associated with the security-related configuration and the corresponding runtime behavior of the software.

11. The non-transitory computer readable medium of claim 10, wherein the event log further comprises metadata associated with the software, the metadata comprising a plurality of hashes associated with a plurality of components of the software executed at the launch time, wherein the successful attestation of the software comprises a successful matching of at least one of the plurality of hashes against a corresponding hash stored at the attestation machine.

12. The non-transitory computer readable medium of claim 9, wherein the security-related configuration comprises remote or local console access configuration of the host machine, and the corresponding runtime behavior of the software when the value associated with the security-related configuration changes comprises discarding the attestation token.

13. The non-transitory computer readable medium of claim 12, wherein generating the claim comprises generating the claim when evaluating the value associated with the security-related configuration at the launch time indicates that the local or remote console access is disabled.

14. The non-transitory computer readable medium of claim 13, wherein if, at runtime, the local or remote console access is enabled, the host machine discards the attestation token.

15. The non-transitory computer readable medium of claim 9, wherein the security-related configuration comprises an attestation status configuration of the software, and the corresponding runtime behavior of the software when the value associated with the security-related configuration changes comprises removing one or more encryption keys the host machine received based on the attestation token.

16. A computer system, comprising:
a memory; and
a processor coupled to the memory, the processor being configured to cause the computer system to:
receive, at an attestation machine, a request from a host machine for attestation of a software executing on the host machine, the request comprising a value associated with a security-related configuration of the software at launch time and a corresponding runtime behavior of the software when the value associated with the security-related configuration changes;
generate a claim based on evaluating the value associated with the security-related configuration and the corresponding runtime behavior of the software when the value associated with the security-related configuration changes;

generate an attestation token after a successful attestation of the software, the attestation token including the generated claim; and transmit the attestation token to the host machine.

17. The computer system of claim 16, wherein the request from the host machine comprises an event log associated with an execution of the software at the launch time, the event log comprising a plurality of entries at least one of which is associated with the security-related configuration and the corresponding runtime behavior of the software.

18. The computer system of claim 16, wherein the security-related configuration comprises remote or local console access configuration of the host machine, and the corresponding runtime behavior of the software when the value associated with the security-related configuration changes comprises discarding the attestation token.

19. The computer system of claim 16, wherein the security-related configuration comprises an attestation status configuration of the software, and the corresponding runtime behavior of the software when the value associated with the security-related configuration changes comprises removing one or more encryption keys the host machine received based on the attestation token.

20. The computer system of claim 16, wherein the attestation token comprises a JSON web token (JWT) and the generated claim is part of a payload of the JWT.

\* \* \* \* \*